Feb. 20, 1940.    H. W. CARLISLE    2,191,313
STORAGE BATTERY
Filed April 15, 1937
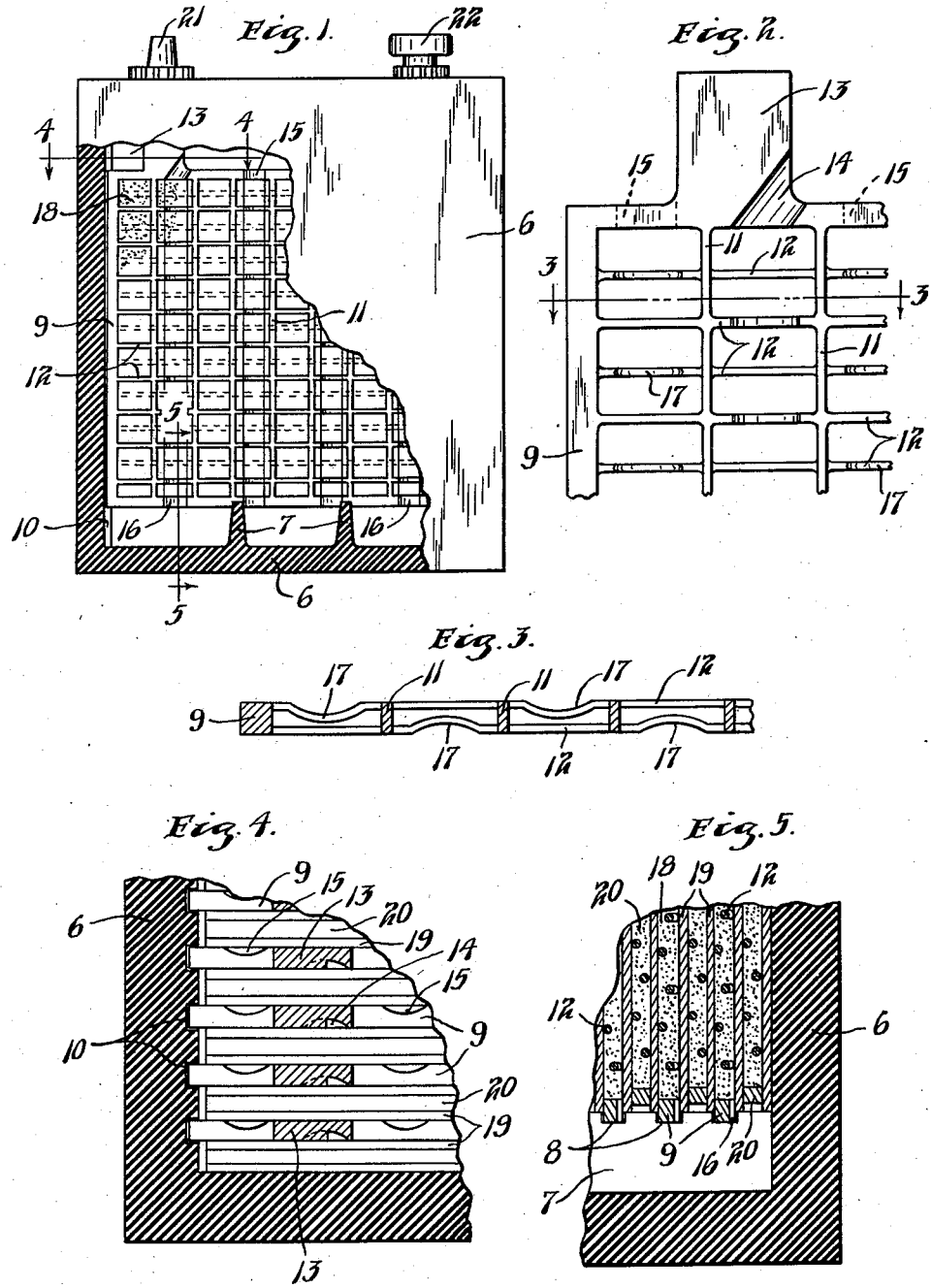
INVENTOR.
HENRY W. CARLISLE.
BY HIS ATTORNEYS.
Williamson & Williamson Patented Feb. 20, 1940

2,191,313

UNITED STATES PATENT OFFICE 2,191,313

STORAGE BATTERY

Henry W. Carlisle, Minneapolis, Minn.

Application April 15, 1937, Serial No. 137,069

3 Claims. (Cl. 136—9)

This invention relates to electric storage batteries, and more particularly to that type which is adaptable for use in connection with motor vehicles, radios, etc.

In portable storage batteries of this general type it is obviously important that they be constructed in a compact manner and, at the same time, produce electricity with a maximum of efficiency.

These batteries are generally formed of an outer rubber casing which contains a plurality of plate members with separating elements placed between them. In the batteries generally used today the plates comprise a grid made of a lead alloy with a lead paste pressed into the grid and supported thereby. The separators are of wood or rubber and are provided with ribs on at least one face thereof to permit circulation of the electrolyte between the separators and the plates.

It is a general object of my invention to provide a plate construction which will permit the use of a greater number of plates within the same area than has heretofore been possible, and, at the same time, to increase the contact surface of said plates. These and other objects and advantages of the invention will more fully appear from the following description made in connection with the accompanying drawing, wherein like reference characters refer to the same or similar parts throughout the views, and, in which:

Fig. 1 is an end elevation of a battery with a portion of the casing broken away;

Fig. 2 is an enlarged fragmentary view of one of the grid members;

Fig. 3 is a section taken on the line 3—3 of Fig. 2;

Fig. 4 is a section taken on the line 4—4 of Fig. 1; and

Fig. 5 is a section taken on the line 5—5 of Fig. 1.

In the particular embodiment of my invention illustrated in the drawing, I have provided a battery casing 6 which is preferably molded from rubber in one piece. Running longitudinally along the inner bottom surface of the casing is a pair of vertical plate-supporting legs 7 which extend the entire length of the casing. As best shown in Fig. 5, the legs 7 are provided along their upper edge with a plurality of notches 8 which are adapted to receive the bottom portions of the grid elements 9 which are a part of the positive battery plates. A plurality of vertical grooves 10 along the inner side walls of the casing 6 are adapted to receive the vertical side members of the grids 9, as shown in Figs. 1 and 4.

The grids 9 include a rectangular outer frame work with a plurality of vertical bars 11 running from the top to the bottom portions of the grid frame. Extending longitudinally of the grid from side to side is a plurality of spaced elements 12 which in the conventional battery construction are substantially straight. In my improved construction, however, I have altered the shape of the cross members 12 in such a manner that a series of vertical grooves are provided from the top of the grid to the bottom. As best shown in Fig. 3, the cross members are so formed between the alternate vertical bars 11 at one side of the grid and between opposite pairs of said vertical bars on the other side of the grid with the result that the grooves are in staggered relationship when looking down upon the grid. While I have altered the shape of the cross members 12, it should be clearly understood that I have not increased the thickness of the grid from the present known types of grids.

Each grid is provided at its top adjacent one corner thereof and partially overlying the spaces between adjacent upright bars 11 with a connector element 13. As best shown in Fig. 2, the connector element is provided with a grooved portion 14 and the top and bottom portions of the grid frame are provided with cutout portions 15 and 16 which form continuations of the grooves or channels provided by the curved portions 17 in the grid cross members.

When the grids have thus been formed, a lead paste 18 is pressed into said grids and held thereby, the paste being applied in such a manner that grooves will be formed to conform to the shape of the grooved portions of the grids.

The positive plates comprising the above described grids and paste are then inserted into the grooves 10 formed in the sides of the battery casing and lowered ino the casing until the bottom portions of the grid frames lie in the notches 8 in the supporting legs 7. These legs ordinarily provide a sediment chamber below the plates of the battery, as is well known in the art.

The separators 19 are provided with smooth faces without the customary ribs above mentioned. The negative plates 20 may be formed in the manner well known to the art.

It is obvious that I have provided in my improved plate construction a greater contact surface on the faces of the plates than if said plates had been made relatively flat. This is due to the fact that the curve of the grooved portions of the plate is of greater lineal measurement than a chord across the arc of said groove. While the increase of area in the case of a single groove is relatively slight, there will be a material increase when the total amount of extra area of each plate is considered. This additional contact area within the electrolyte permits a much greater output of current from the batery, a feature which is particularly desirable in an automobile battery because of the numerous uses for which electrical current is utilized. It will also increase the life of the battery in colder climates where automobile motor starters requires considerable output of current in a short space of time.

The grooves in the plates are also provided to permit circulation of the electrolyte within the casing. Heretofore circulation was provided for by forming ribs upon the separators. My construction, however, eliminates the need for ribbed separtors and consequently reduces the thickness of said separators by approximately one-half with the natural result that more plates can be inserted within the same space occupied by a lesser number of plates in former constructions.

While it is true that the cut-out portions 15 and 16 in the top and bottom portions of the grid frame will weaken the grid structure, I have counteracted that by positioning the plates in the channels 10 in the walls of the casing and the notches 8 in the legs 7. As a matter of fact, with this means of holding the grid frames I have found that it is practically impossible for the plates of the battery to buckle, this tendency to buckle being greater in the positive plates.

Of course, the casing will be provided with a plurality of partitions for separating the battery into cells, but I have not gone into that construction because it is common practice in the art. Furthermore, the terminal 21 and the connector strap 22 are of conventional construction.

It will, of course, be understood that various changes may be made in the form, details, arrangement and proportions of the various parts without departing from the scope of the invention.

What is claimed is:

1. In a storage battery, a plate comprising a supporting grid and an electrode material, said grid being composed of spaced open work walls made up of a network of rod-like elements, certain of said rod-like elements having substantially straight portions lying in planes defining the overall thickness of said plates, said last mentioned rod-like elements having, at spaced intervals, portions extending inwardly between said planes, the inwardly extending portions of said rod-like elements providing skeleton groove forms, and said electrode material being filled in between said walls and having substantially flat side surfaces between the straight portions of said rod-like elements, and said electrode material being substantially vertically grooved, the size and shape of said grooves in said material being determined by the skeleton groove forms provided by the inwardly extending portions of adjacent spaced rod-like elements.

2. The structure in claim 1 and the upper and lower edges of said grid having continuations of the grooves in said electrode material.

3. The structure in claim 1 and said grid having upper and lower frame elements whose thickness is substantially as great as the over all thickness of the plate, a connector strip extending upwardly from and of less width than the upper frame element and having a thickness equal to and lying in the same direction with the thickness of said upper frame element so as to completely overlie it, and said connector strip and upper frame element having a common groove therein affording communication between at least one of the grooves formed in said electrode material and the space above the upper frame element, whereby a flat separator can be placed against a side of said plate and circulation of electrolyte will take place in the groove in said connector strip and frame element and the groove in said electrode material with which it communicates.

HENRY W. CARLISLE.